United States Patent [19]
Sumner et al.

[11] 3,885,526
[45] May 27, 1975

[54] ANIMAL FEEDER CONSTRUCTION
[76] Inventors: Elton Sumner, 425 Brookwood Dr., Athens, Ga. 30601; Aaron W. Adams, Jr., Douglas, Ga. 31533
[22] Filed: Jan. 25, 1972
[21] Appl. No.: 220,601

Related U.S. Application Data
[63] Continuation-in-part of Ser. No. 72,971, Sept. 17, 1970, Pat. No. 3,636,928.

[52] U.S. Cl. .......................................... 119/52 AF
[51] Int. Cl. ............................................ A01k 5/02
[58] Field of Search ..................... 119/52 AF, 52 R

[56] References Cited
UNITED STATES PATENTS
| | | | |
|---|---|---|---|
| 3,031,063 | 4/1962 | Siebring | 119/52 AF |
| 3,125,989 | 3/1964 | Cordis | 119/52 R |
| 3,523,519 | 8/1970 | Hostetler | 119/52 AF |

*Primary Examiner*—Hugh R. Chamblee
*Attorney, Agent, or Firm*—B. J. Powell

[57] ABSTRACT

An animal feeder having an auger construction including an elongated flexible, resilient, open cored, spring-type auger with a core member carried within the open core of the auger and substantially filling this core yet movable with respect to at least a plurality of flights of the auger so that, as the auger flights move with respect to each other while the auger is conveying particulate matter such as poultry feed, the flights and core member will move relative to each other. The core member may be substantially rigid for a straight auger or flexible for a curved auger. The feeder system described includes a feed supply means with means for regulating the amount of feed carried by the auger and return mechanism is provided for returning the excess feed discharged from the auger back to the supply means for recycling this feed.

7 Claims, 7 Drawing Figures

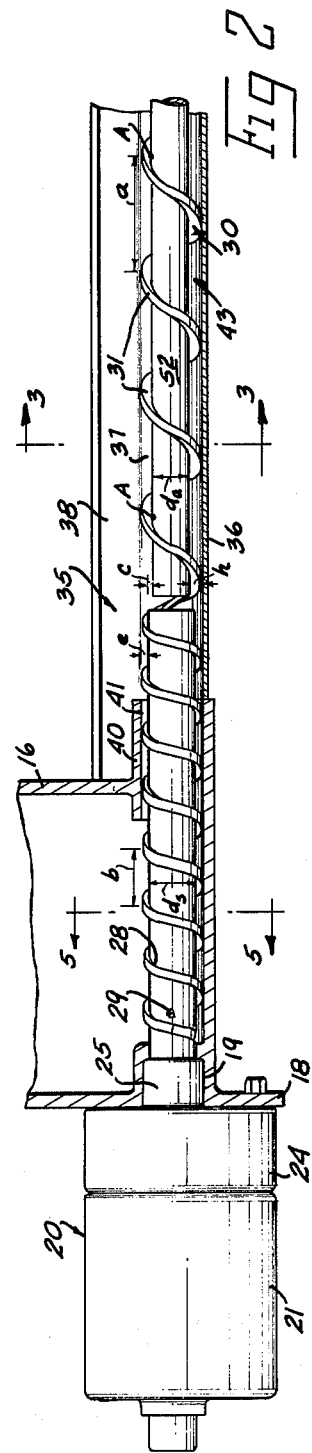
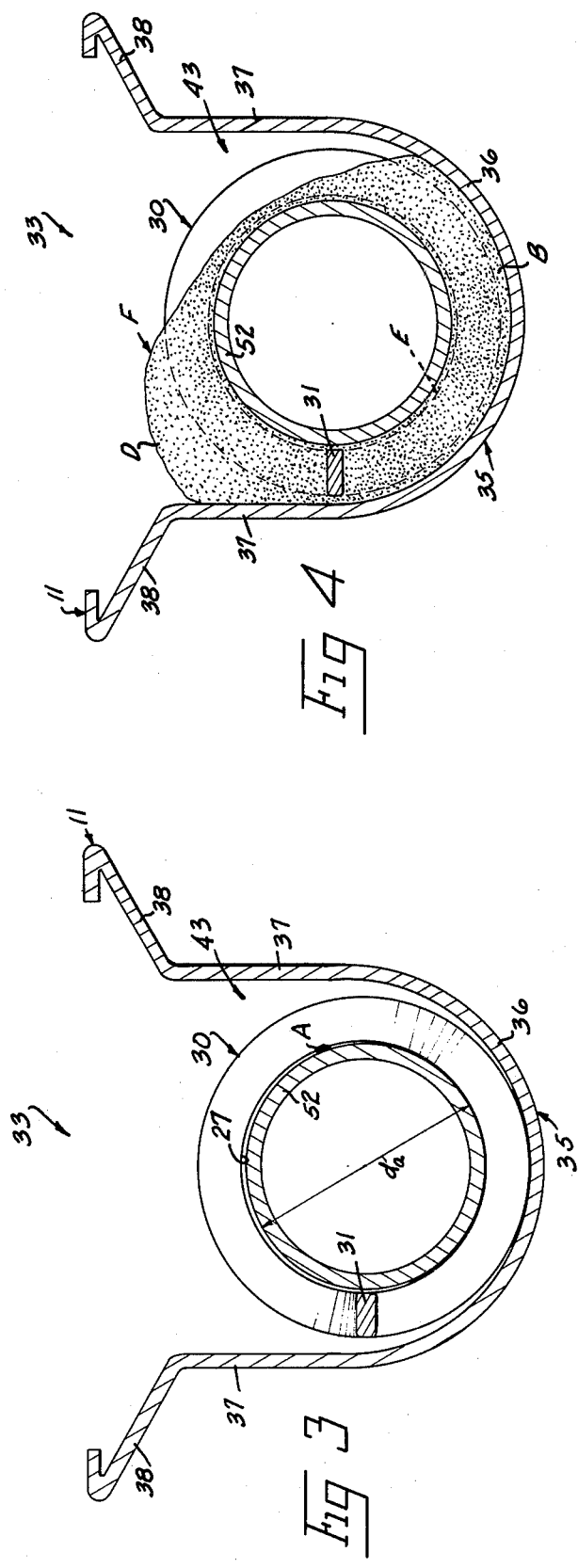

ANIMAL FEEDER CONSTRUCTION

CROSS-REFERENCE TO RELATED APPLICATIONS

This is a continuation-in-part application of our co-pending application Ser. No. 72,971, filed Sept. 17, 1970, entitled "Auger Construction," now U.S. Pat. No. 3,636,928.

BACKGROUND OF THE INVENTION

There are presently two general types of augers used for transporting particulate material such as poultry feed. One type is the solid core auger and the other type is the open core spring-type auger. While the solid core auger is able to transport the material in an open trough, it is expensive to make since the auger flights must be attached to the core by means such as welding, does not lend itself to use as a flexible auger, requires shock abosrbing couplings interspersed therein for long runs, and causes material buildup along its length so that the auger will dislodge itself from the trough. The open core-spring-type auger is flexible and can be manufactured economically, but must be used in a tube which confines the auger in order to operate. In the poultry feeding industry, it is highly desirable that the feed never leave the conveyor since the feed cannot be recaptured once it leaves and frequently becomes stale. Since the open cored auger must be confined in order to prevent undesirable feed carrying and distribution characteristics, it is impractical to use this auger unless the feed leaves the auger before being consumed. Since poultry frequently deposit water and other liquids as well as foreign material in the feed while eating and since condensation also occurs, this causes undesirable feed carrying and distribution characteristics thereof and causes feed to build up under the auger so as to eventually lift the auger out of the trough.

It has also been found that prior art animal feeders have had difficulty in accurately controlling the amount of feed distributed by the auger. This has resulted in excess feed being carried by the auger to become contaminated before recirculation or in too little feed being distributed for proper feeding of the animals.

SUMMARY OF THE INVENTION

These and other problems and disadvantages of the prior art are overcome by the invention disclosed herein in that an auger construction is provided which can transport particulate material in an open trough, yet is flexible and can be economically manufactured. Moreover, the invention is self-cleaning to prevent material buildup on the flights of the auger and the core member carried in the auger, and permits a feeding system to be made in which the feed does not have to leave the auger until it is consumed by the poultry.

The apparatus of the invention includes a U-shaped open top trough with an open cored spring-type auger carried in the trough and freely rotatable therein with a non-supporting core freely receivable in the open core positioned therein. A motor is appropriately connected to the auger for driving same. The core may be flexible if it is desired that the auger is to be curved or rigid if the auger is to be straight. At least a plurality of the flights of the auger are unattached to the core so that relative movement between the auger flights and the core can take place to prevent material buildup along the flights of the auger. Means is also provided for changing the spacing between auger flights within the hopper to control the amount of feed being distributed by the auger and for reducing the unit conveying surface area within the hopper.

These and other features and advantages of the invention will become apparent upon consideration of the following specification and accompanying drawings wherein like characters of reference designate corresponding parts throughout the several views and wherein:

BRIEF DESCRIPTION OF THE DRAWINGS

FIG. 2 is an enlarged longitudinal cross-sectional view of the feeding system of FIG. 1 showing the auger construction;

FIG. 3 is an enlarged transverse cross-sectional view taken along line 3—3 in FIG. 2;

FIG. 4 is a view similar to FIG. 3 showing the invention is use transporting material;

Figure 1:
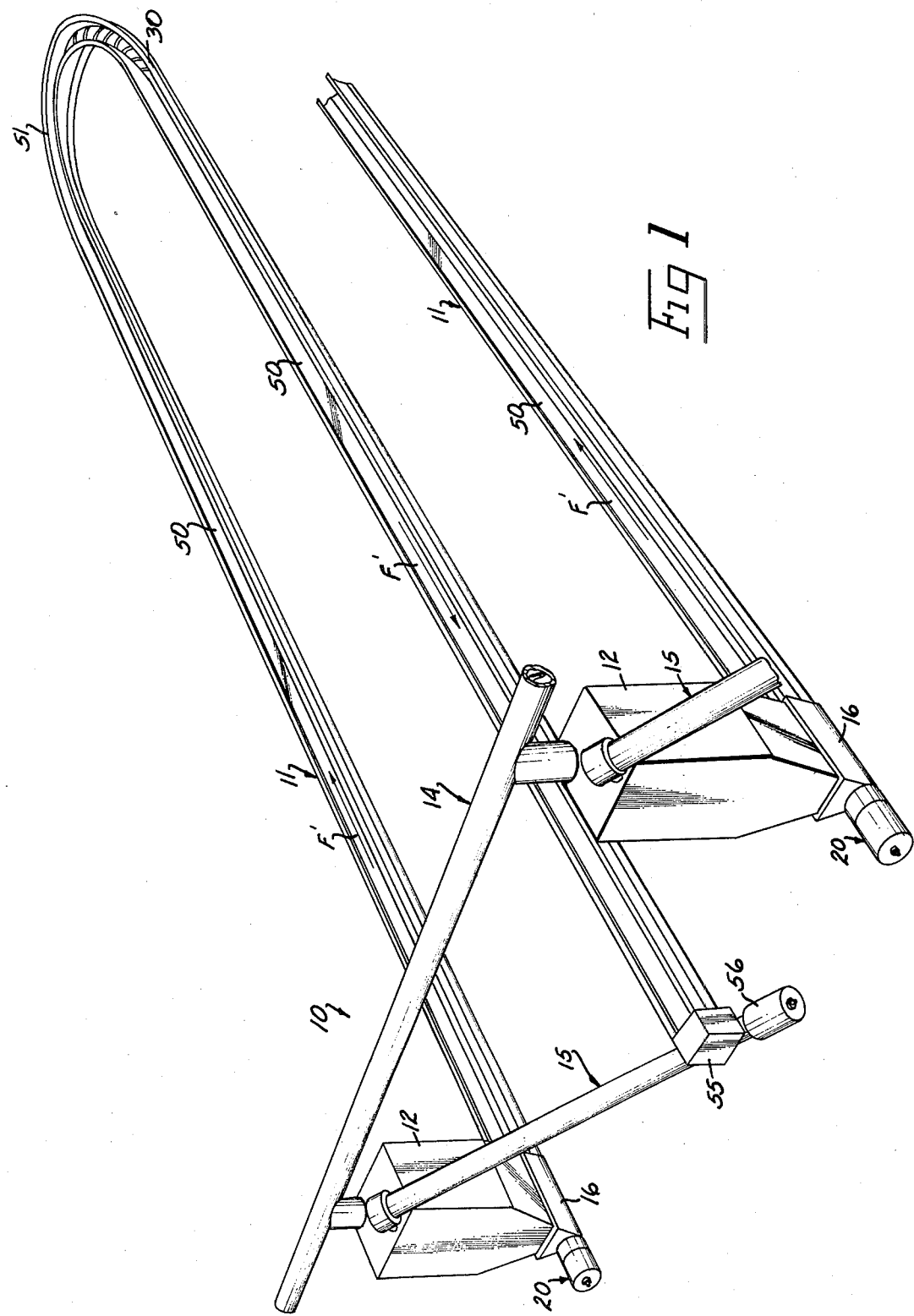
FIG. 1 is a perspective view illustrating the invention embodied in a poultry feeding system.
Figure 6:
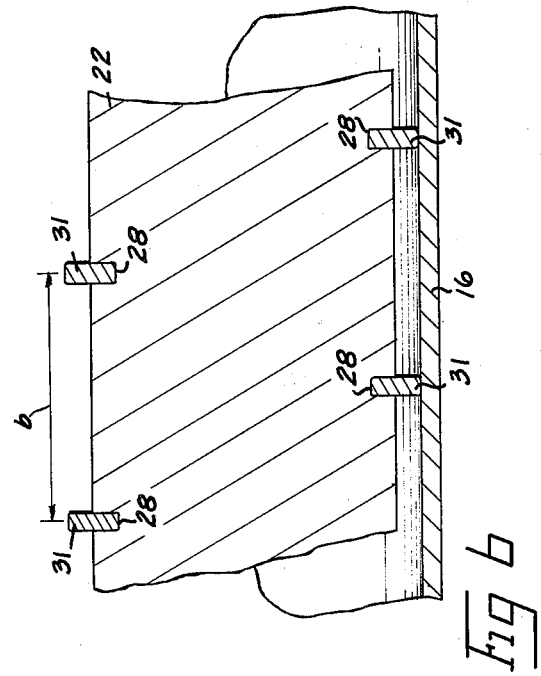
FIG. 6 is a cross-sectional view taken along line 6—6 in FIG. 5.

These figures and the following detailed description discloses specific embodiments of the invention, however, it is to be understood that the invention concept is not limited thereto since it may be embodied in other forms.

DETAILED DESCRIPTION OF ILLUSTRATIVE EMBODIMENTS

Referring to the figures, it will be seen that the invention is embodied in a feeding system 10. The system 10 is adapted to be installed in a poultry house (not shown) and includes a plurality of feeder-conveyors 11 which extend through the house for the poultry therein to be supplied with feed. Each feeder-conveyor 11 is provided with a supply hopper 12 and these supply hoppers 12 are in turn supplied with feed from an outside receptacle (not shown) through a supply conveyor 14. Each feeder-conveyor 11 may also be provided with a return conveyor 15 for returning the excess feed at the end of the feeder-conveyors 11 back to the supply hopper 12 for recycling of the feed.

Figure 5:
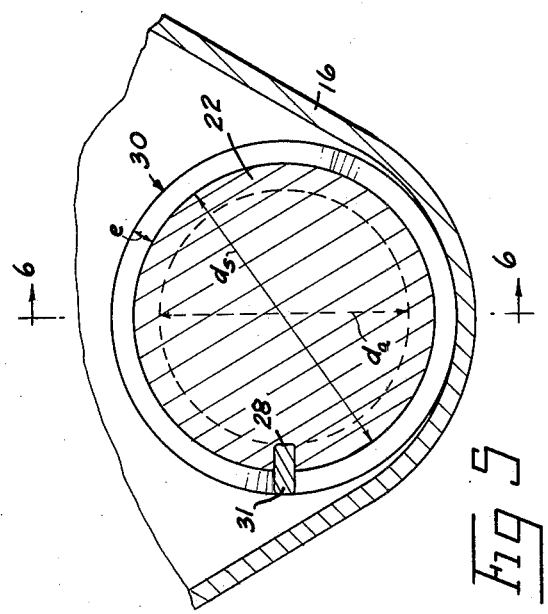
FIG. 5 is a cross-sectional view taken along line 5—5 in FIG. 2.

As is best seen in FIGS. 1, 2, and 5, each feeder-conveyor 11 includes a receptacle 16 which fits under the open lower end of the feed hoppers 12 and serves as a means for introducing the feed from the hopper 12 into the feeder-conveyor 11. Each receptacle 16 is provided with a motor mount 18 as seen in FIG. 2 and a bearing support 19 for the drive of the auger 30. The auger drive unit 20 is carried by the motor mount 18 and includes a motor 21 connected to an auger drive shaft 22 through a transmission 24. The drive shaft 22 is mounted in a bearing 25 carried in the bearing support 19 and extends through the hopper 12 and out of the discharge end of receptacle 16. The shaft 22 is provided with a milled helical slot 28 and set screw 29 for locking the auger 30 onto the drive shaft 22 as wil be explained.

The auger 30 is an elongated one-piece, open core, flexible and resilient screw member which is formed from a resilient wire having a generally rectangular cross-section and which is generally referred to in the industry as a spring-type auger. The strength of auger 30 is such that it will not collapse when subjected to a sufficient force to carry the feed. The auger 30 is made up of a plurality of helical flights 31, each forming a complete circle integral with each other and defining an open core 27 therethrough.

The auger 30 is supported in a U-shaped trough 35 with a semicircular bottom section 36 and a pair of upstanding walls 37 defining an auger recess 43 therebetween. A pair of diverging flanges 38 are provided along the top edges of walls 37. The end of trough 35 is attached to the discharge end of the receptacle 16.

The discharge end of receptacle 16 is provided with a tubular section 40 as best seen in FIGS. 2 and 5. The tubular section 40 extends through the discharge end of receptacle 16 and defines a passage 41 therethrough which the auger 30 rotatable extends. The drive shaft 22 extends through the passage 41 to terminate within trough 35.

Because the normal flight spacing $a$ of the auger 30 will cause excess feed to be discharged from hopper 12 into trough 35 through tubular section 40, the flight spacing of auger 30 on the shaft 22 is reduced as indicated at $b$ for a higher pitch. This is accomplished using a diameter $d_s$ for shaft 22 which is a prescribed amount $c$ greater than the diameter $d_a$ of the open core 27 of auger 30. The helical slot 28 is formed around shaft 22 with the spacing $b$ between adjacent flights of the slot. The end of auger 30 is then screwed onto shaft 22 so that the flights 31 lie in slot 28 and thus has the flight spacing b within receptacle 16. It will also be noted that the amount $e$ of exposure of the flights 31 on shaft 22 is less than the height $h$ of each flight. This also serves to reduce the amount of feed discharged from receptacle 16. Thus, not only is the pitch of the flights of auger 31 increased within receptacle 16 under hopper 12, the exposed unit conveying surface area flights 31 is also reduced.

The trough 35 shown in FIG. 1 has a pair of straight sections 50 with a curved section 51 joining the sections 50 at one end. Since the auger 30 is flexible, a single auger 30 may be used for the entire length of trough 35.

A non-supporting core member 52 freely receivable in the open core 27 of auger 30 is positioned therein as shown in FIGS. 2-4. Member 52 is illustrated as tubular but may also be solid. For use in the auger 30 shown in FIG. 1, at least that portion of core member 52 at the curved section 51 if trough 35 must be flexible in order for the auger 30 to lie in section 51. For straight runs of the auger 30, the core member 52 may be either rigid or flexible. The rigid sections of core member 52 will usually be made of metal while the flexible sections will usually be a synthetic material such as a polyvinyl chloride. The core member 52 almost fills the open core 27 or auger 30 yet will allow relative movement between the flights 31 and the core member. Therefore, it will be seen that the core member 52 does not add any significant strength to the auger 30 but simply acts to fill the void of the open core. The core member 52 may be attached to flights 31 at spaced apart locations as indicated at A to retain the core member within the auger without affecting the flexing action. This is especially true if the attached points are located remotely of the ends of the auger.

During actual operation in which auger 30 is transporting material, the flights 31 are constantly being flexed back and forth with respect to each other. Since the core member 52 is not attached to at least a plurality of these flights 31, the flights are constantly moving with respect to the core member 52. As moisture tends to cause the material being transported to adhere to the flights 31 and core member 52, the constant movement of the core member relative to the flights dislodges the caked material and is constantly cleaning the auger and core member.

Referring to FIG. 1, it will be seen that the return conveyor 15 is connected to the end of the return run of conveyor 11 through its catch hopper 55. Motor 56 then drives the conveyor 15 to lift the excess material received from conveyor 11 back to hopper 12 for recycling through feeder-conveyor 11. It is also to be understood that an appropriate transmission may be attached to the distal end of auger 30 for driving conveyor 14 from the drive unit 20. If only straight runs of feeder-conveyor 11 are used, then a transfer conveyor (not shown) similar to conveyor 15 would connect the distal ends of the feeder-conveyors and a hopper and drive unit would be provided at the distal end of the return feeder-conveyor. It is to be further understood that different types of conveyors 15 and the transfer conveyors may be substituted for those shown.

Figure 7:
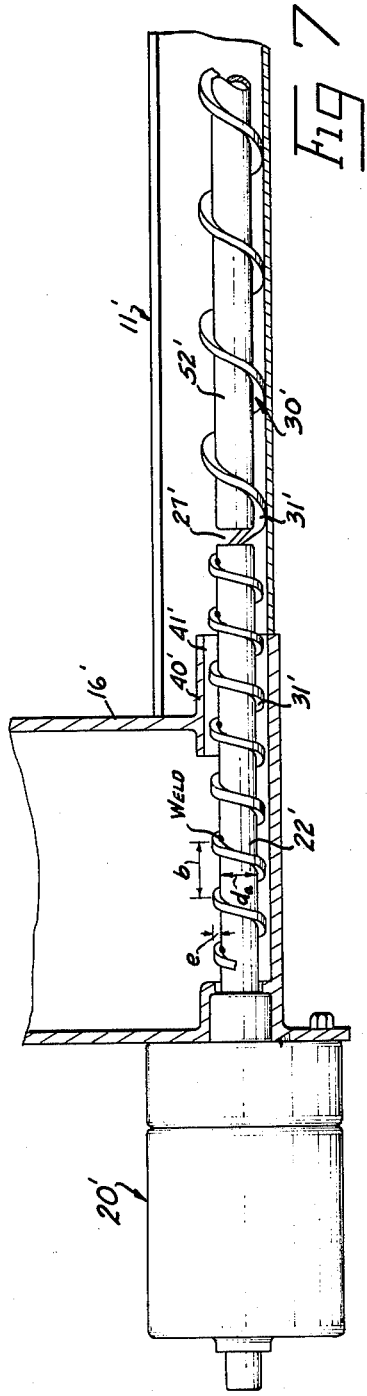
FIG. 7 is a view similar to FIG. 2 showing a second embodiment of the flight spacing adjusting mechanism.

Referring more particularly to FIG. 7, an alternate embodiment of the receptacle and drive unit are disclosed. In this embodiment, the drive shaft 22' of drive unit 20' has a diameter $d_a$ corresponding to that of core 27' defined by flights 31' of auger 30'. The end of auger 30' is forced onto shaft 22' until the proper flight spacing $b$ is achieved and the flights 31' attached to shaft 22' as by welding to maintain the spacing. The outer periphery of flights 31' attached to shaft 22' is removed until the proper exposure $e$ is obtained.

The passage 41' in the tubular section 40' of receptacle 16' is reduced in diameter to correspond to the reduced diameter of auger 30'. This achieves the same results as the first embodiment of the receptacle and drive unit.

OPERATION

In operation, it will be seen that the conveyor 14 is operated to supply feed to the hoppers 12. The drive units 20 are operated to rotate auger 30 in the appropriate direction to cause the feed to be moved along the troughs 35 as indicated by arrows F'.

Referring particularly to FIG. 3 which illustrates the auger 30 when it is not operating and no feed is in trough 35, it will be seen that auger 30 is resting on the lowermost portion of bottom section 36. As soon as feed F is supplied to the auger 30 and the auger is rotated clockwise as illustrated in FIG. 4, it will be seen that the torque exerted on the auger 30 causes it to move laterally in the trough. The auger will assume a position in which the outer edges of the flights 31 ride on a thin layer B of the feed. The thinnest portion of the layer B will be somewhere in the vicinity of point C. Thus, it will be seen that the auger 30 rides on a cushion of feed so as to virtually eliminate wear between the trough 35 and auger 30.

The core member 52 causes the feed to assume the configuration shown in FIG. 4. This configuration provides a feeding area D adjacent the upper end of the near wall 37 (the left wall in FIG. 4) which is sufficiently deep to allow the poultry to eat from this area yet shallow enough to prevent the poultry from inserting their beaks too far down in the feed. This results in a significant feed saving over a period of time by the reduction of the amount of feed lost when it clings to other parts of the poultry's heads beside the beak. While the trough 35 has a sufficiently wide opening 33 therein for the poultry to easily insert their heads for feeding, the width of the feeding area D is relatively narrow so that those portions of the poultry's bodies other than the beak will not be dragged through the feed to waste same.

The auger construction shown virtually eliminates feed separation that is normally associated with chain-type feeder systems. The construction also allows the poultry to be fed without the feed ever leaving the auger 30 until it is consumed by the poultry.

Since the core member 52 is unattached to at least a plurality of the flights 31, the action of feed F and the drive unit 20 on the auger 30 causes the flights 31 to be constantly moving relative to each other along the centerline of the auger. The core member, being a unitary member for a significant portion of the auger, allows the flights 31 to move with respect to it. Thus, any feed that tends to cake along on the flights 31 or core member 52 is quickly dislodged and broken up to insure free movement of the feed along the feeder-conveyor 11 and to prevent an accumulation of stale feed on the auger.

The exposure e of the flights 31 or 31' in combination with the increased pitch thereof under hopper 12 causes the discharge rate of the feed into the feeder-conveyors 11 not to exceed the carrying capacity of the conveyors 11 to prevent excess feed buildup.

The auger 30 is operated at a sufficient rpm to maintain the feeding area D along the entire length of feeder-conveyor 11. This causes an excess of feed at the end of the return run or section 50 of conveyor 11 which is dumped into catch hopper 55 to be returned to supply hopper 12 by return conveyor 15. If straight runs of the feeder-conveyor 11 are used, then the transfer conveyor (not shown) similar to conveyor 15 receives the feed from the distal end of the straight run of the feeder-conveyor 11 connected to hopper 12 and transfers this feed to the return section of the feeder-conveyor 11. Thus, it will be seen that if straight runs of feeder-conveyor 11 are used, there will be a hopper 12 for every other run of the conveyor 11 with the transfer conveyor supplying feed to those runs of the conveyor 11 not connected to hopper 12.

The invention disclosed herein is suitable for use in present poultry houses whether of the floor-growing type or caged type. Appropriate hanging mechanisms may be provided for selectively adjusting the feeder-conveyors 11 to the proper height in each operation. The invention is particularly adapted for use with caged poultry, expecially layers, where the availability of fresh feed is critical to egg size and grade.

While specific embodiments of the invention have been disclosed herein, it is to be understood that the full use of substitutes, modifications and equivalents may be used without departing from the scope of the inventive concept.

What is claimed is:

1. In an animal feeder construction for transporting particulate feed material,
    a feed hopper for holding the feed material;
    a distribution means connected to said feed hopper through which the feed material from said hopper is to be distributed;
    an open cored spring-type auger having endless helical flights of a constant cross-sectional height capable of transmitting turning torque rotatably carried in said hopper and extending therefrom into said distribution means for transporting said feed material from said hopper into said distribution system, said helical flights defining a feed conveying surface thereon;
    drive means for selectively rotating said auger means to distribute said feed material, said drive means including a drive shaft having a diameter a predetermined amount greater than the diameter of said open core, said drive shaft defining a helical recess therearound and receiving said helical flights therein to reduce the exposed cross-sectional height of said flights within said hopper so that said helical flights of said auger lying within said hopper have a unit conveying surface area less than the unit conveying surface area within said distribution means.

2. In an animal feeder construction as set forth in claim 1 wherein the pitch of said recess is greater than the pitch of said auger in said distribution means to increase the pitch of said helical flights on said drive shaft.

3. In an animal feeder construction as set forth in claim 1 further including a non-torque transmitting core member of a size freely receivable in the open core of said auger within said distribution means, said core being unattached to at least a plurality of adjacent flights of said auger so that relative movement between said auger flights and core member takes place as an incident to the passage of the particulate material along said auger.

4. The feeder construction of claim 3 wherein said points of attachment of said auger flights to said core member are remote from the ends of said auger.

5. The feeder construction of claim 4 wherein said core member is flexible.

6. The feeder construction of claim 4 wherein said core member is hollow and substantially rigid.

7. In an animal feeder construction as set forth in claim 3 wherein said distribution means further includes an open top trough in which said auger is rotatably supported.

* * * * *